(12) United States Patent  
Chemudupati et al.

(10) Patent No.: US 7,480,832 B2  
(45) Date of Patent: Jan. 20, 2009

(54) CENTRALIZED ERROR SIGNALING AND LOGGING

(75) Inventors: Suresh Chemudupati, Marlborough, MA (US); Victor T. Lau, Marlborough, MA (US); Bruno DiPlacido, Westborough, MA (US); Eric J. DeHaemer, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 552 days.

(21) Appl. No.: 11/165,725

(22) Filed: Jun. 24, 2005

(65) Prior Publication Data

US 2007/0011548 A1    Jan. 11, 2007

(51) Int. Cl.  
*G06F 11/00* (2006.01)

(52) U.S. Cl. .............................. 714/43; 714/4; 714/39; 709/220; 709/230

(58) Field of Classification Search ...................... 714/4, 714/39, 43; 709/220, 230  
See application file for complete search history.

(56) References Cited

U.S. PATENT DOCUMENTS 6,009,488 A    12/1999    Kavipurapu

2004/0019835 A1*    1/2004    Marisetty et al. ............... 714/48  
2005/0034045 A1*    2/2005    Lueck et al. .................. 714/746  
2005/0154946 A1*    7/2005    Mitbander et al. ........... 714/724

OTHER PUBLICATIONS

Ravi Budruck, PCI Express System Architecture, Addison-Wesley,2003, Chapter 10, level 1, section 5, pp. 1-4.*  
Ravi Budruck, PCI Express System Architecture, Addison-Wesley, 2003, Chapter 10, level 1, section 10, pp. 1-9.*  
Ravi Budruck, PCI Express System Architecture, Addison-Wesley, 2003, Chapter 2, level 1, section 5, pp. 1-21.*

* cited by examiner

*Primary Examiner*—Robert Beausoliel  
*Assistant Examiner*—Charles Ehne  
(74) *Attorney, Agent, or Firm*—Derek J. Reynolds

(57) ABSTRACT

A device, method, and system are disclosed. In one embodiment, the device comprises one or more error receiving units, each operable to receive error requests from a given layer in a protocol and synchronize the received error requests to a common clock domain for all layers, and an arbiter unit operable to receive the synchronized error requests from the one or more error receiving units, encode the error requests onto on a common error interconnect, and route the encoded error requests across the interconnect to configuration space.

19 Claims, 5 Drawing Sheets

CENTRALIZED ERROR SIGNALING AND LOGGING

FIELD OF THE INVENTION

The invention relates to centralized error signaling and logging. More specifically, the invention relates to implementing a centralized error signaling and logging scheme with a common error interconnect on PCI Express™ for both single function and multi-function errors.

BACKGROUND OF THE INVENTION

Error reporting in computer systems generally takes up many interconnect lines and inefficiently utilizes multiple clock domains. In particular, PCI Express™ protocol error handling involves errors in all three layers (physical, link, and transaction layers) and there is a different clock domain and separate interconnect lines for each layer. Currently, there must be an error handling block for each PCI Express™ layer. The multiple error handling blocks create redundant logic, increase the number of interconnect lines utilized for logging errors in the device/function configuration space, and slow down error transactions because the clock domains are not synchronized.

BRIEF DESCRIPTION OF THE DRAWINGS

The present invention is illustrated by way of example and is not limited by the figures of the accompanying drawings, in which like references indicate similar elements, and in which.

DETAILED DESCRIPTION OF THE INVENTION

Embodiments of a device, method, and system for centralized error signaling and logging are disclosed. In the following description, numerous specific details are set forth. However, it is understood that embodiments may be practiced without these specific details. In other instances, well-known elements, specifications, and protocols have not been discussed in detail in order to avoid obscuring the present invention.

Figure 1:
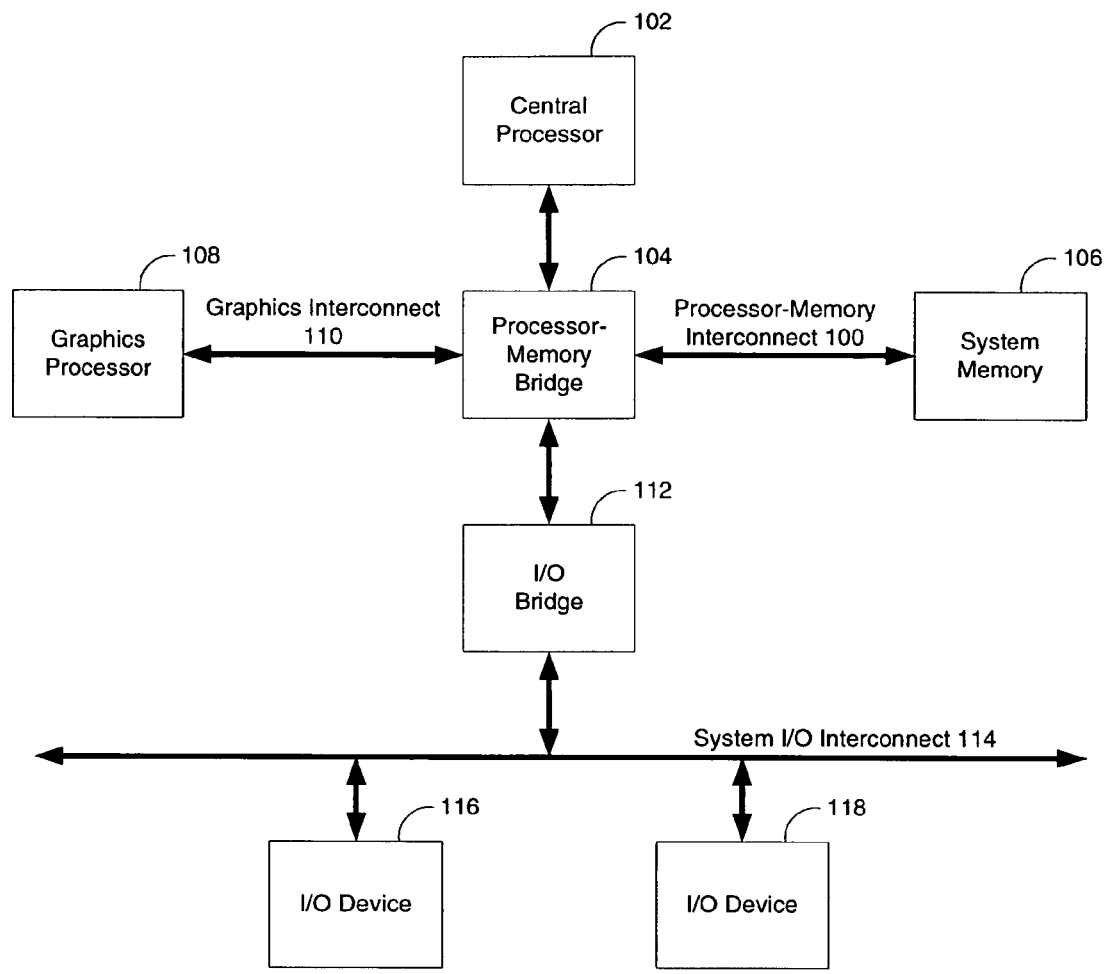
FIG. 1 is a block diagram of a computer system which may be used with embodiments of the present invention.

FIG. 1 is a block diagram of a computer system which may be used with embodiments of the present invention. The computer system comprises a processor-memory interconnect 100 for communication between different agents coupled to interconnect 100, such as processors, bridges, memory devices, etc. Processor-memory interconnect 100 includes specific interconnect lines that send arbitration, address, data, and control information (not shown). In one embodiment, central processor 102 is coupled to processor-memory interconnect 100 through processor-memory bridge 104. In another embodiment, there are multiple central processors coupled to processor-memory interconnect (multiple processors are not shown in this figure).

Processor-memory interconnect 100 provides the central processor 102 and other devices access to the memory subsystem. In one embodiment, a system memory controller that controls access to system memory 106 is located on the same chip as processor-memory bridge 104. In another embodiment, a system memory controller is located on the same chip as central processor 102. Information, instructions, and other data may be stored in system memory 106 for use by central processor 102 as well as many other potential devices. In one embodiment, a graphics processor 108 is coupled to processor-memory bridge 104 through a graphics interconnect 110. In one embodiment, graphics interconnect 110 is a PCI Express™×16 interconnect.

I/O devices 116 and 118 are coupled to system I/O interconnect 114 and to processor-memory interconnect 100 through I/O bridge 112 and processor-memory bridge 104. I/O Bridge 112 is coupled to processor-memory interconnect 100 (through processor-memory bridge 104) and system I/O interconnect 114 to provide an interface for a device on one interconnect to communicate with a device on the other interconnect. In one embodiment, I/O devices 116 and 118 are PCI Express™ endpoints.

Figure 2:
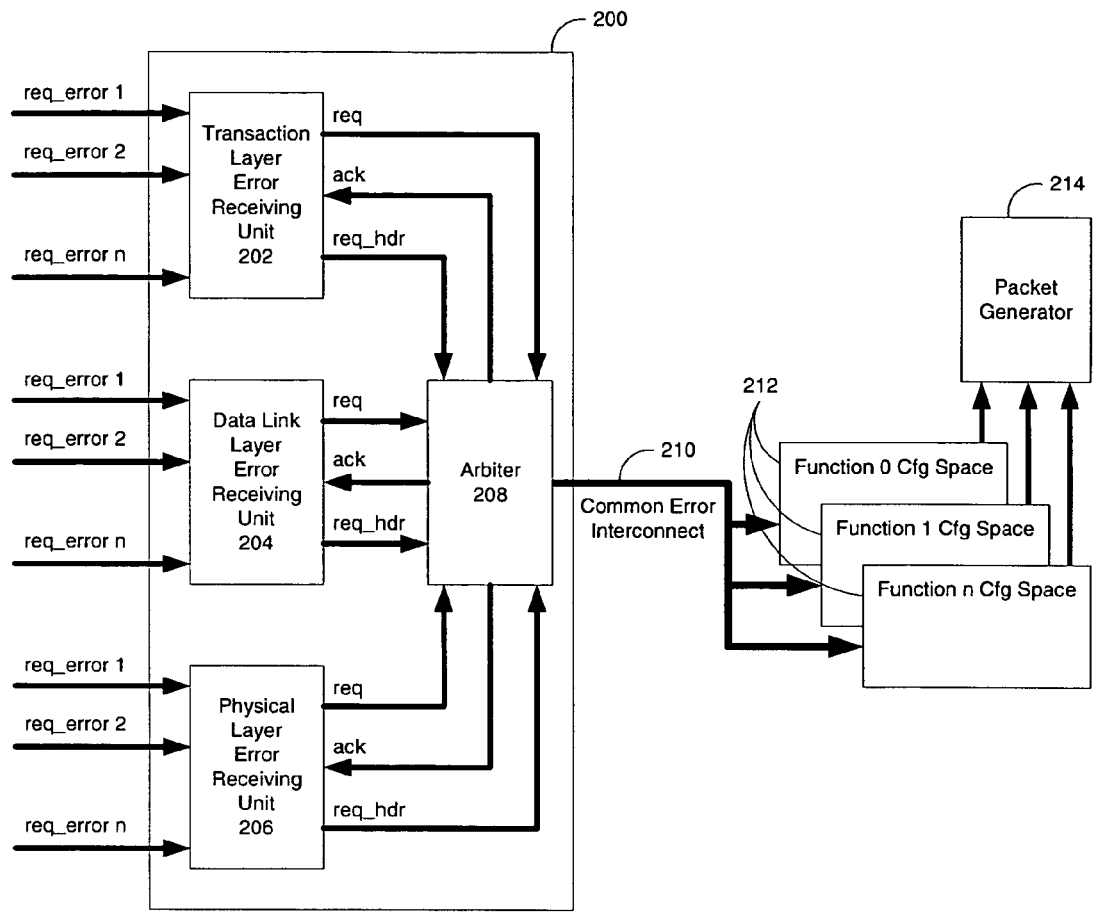
FIG. 2 describes one embodiment of a centralized error signaling and logging device.

FIG. 2 describes one embodiment of a centralized error signaling and logging device. In different embodiments, the device may be located, in FIG. 1, on the same chip as the I/O bridge 112, on the same chip as the processor-memory bridge 104, on the same chip as another device pictured in FIG. 1, or on a discrete chip. Returning to FIG. 2, in one embodiment, the centralized error signaling and logging device is implemented in a PCI Express™-based computer system. In this embodiment, the main error signaling and logging unit 200 contains a transaction layer error receiving unit 202, a data link layer error receiving unit 204, and a physical layer error receiving unit 206. The three receiving units receive error requests (req_error 1-n) from devices in the computer system in the three PCI Express™ layers (transaction, link, and physical).

Error requests received from different PCI Express™ protocol layers may be in different clock domains. Additionally, these different protocol layer error requests could also be comprised of pulses or level signals. Different PCI Express™ devices can send the error requests in these distinctive ways. Thus, in one embodiment, each layer's receiving unit has logic to convert these diverse types of error requests into a uniform level request signal that is then sent to an arbiter 208. The receiving unit that receives the error request synchronizes the error request to a common error clock. Once synchronized, the receiving unit sends the error request (req) and the error request header (req_hdr) to the arbiter 208. When the arbiter 208 receives the synchronized error request, it returns an acknowledgement (ack) to the receiving unit.

The arbiter 208 may receive multiple error requests at a substantially simultaneous time. In this case, the arbiter 208 determines the servicing order of the simultaneous error requests. In different embodiments, the arbiter may utilize one or more different deterministic algorithms to resolve the servicing order of the two or more simultaneous error requests. For example, the determining factor of the servicing order may be any one of the following: the layer the error is in, the priority of the error based on a priority list of all possible errors, an equally weighted randomizing formula for error ordering, among others.

Additionally, the arbiter 208 may receive multiple back-to-back error requests that are the same error. In this case, once the arbiter 208 determines that there is a second redundant error request, the arbiter 208 collapses the two or more back-to-back error requests down to a single error.

Once the arbiter has determined any necessary order of error requests and has eliminated all redundant errors, it encodes each error onto a single common error interconnect 210. The arbiter 208 sends the encoded errors across the common error interconnect 210 to log the errors in each function's configuration space 212 in system memory. Each device may have either one function or multiple functions. Each device function has it's own configuration space (as shown by 212). The common error interconnect 210 is a single interconnect that connects the arbiter 208 to all functions' configuration space. Therefore, when an error is sent across the common error interconnect 210, the arbiter 208 sends the error to all functions (specifically to their configuration space). The sent error has embedded information that specifies the error is applicable to one or more functions. Thus, when the error is sent across the common error interconnect 210, every function's configuration space (212) has logic to determine whether the error applies to that particular function. Each individual function decodes the error and determines whether or not it needs to respond to the error.

In one embodiment, errors that are encoded by the arbiter 208 onto the common error interconnect have one or more associated function numbers. In one embodiment, an error can be targeted to one function, multiple functions, or all functions through these function numbers. When the error targets all functions the arbiter is effectively broadcasting the error to all functions' configuration space.

In one embodiment, each function responds to the error based on error severity level settings configured in configuration space 212. Each function, in turn, responds (i.e., performs some error handling logic) or doesn't respond to the error based on the severity level.

Additionally, in one embodiment, once an error is received and handled by the appropriate function's configuration space, the function has logic to create a log for the error. The one or more functions that receive the error can log the error independently. There is not a need for a central error logging function, rather, the error logging functionality of the device is decentralized and handled on a function by function basis. In one embodiment, the function's configuration space also has logic that can independently send the error across a PCI Express™ interconnect by sending the received error to a packet generator 214 to generate error messages in transaction layer packets to upstream locations, such as a PCI Express™ Root Complex. In one embodiment, the packet generator has a second arbiter within it that prioritizes error packets across the PCI Express™ interconnect when multiple function configuration spaces attempt to send out error packets to a PCI Express™ Root Complex at substantially the same time.

Figure 3:
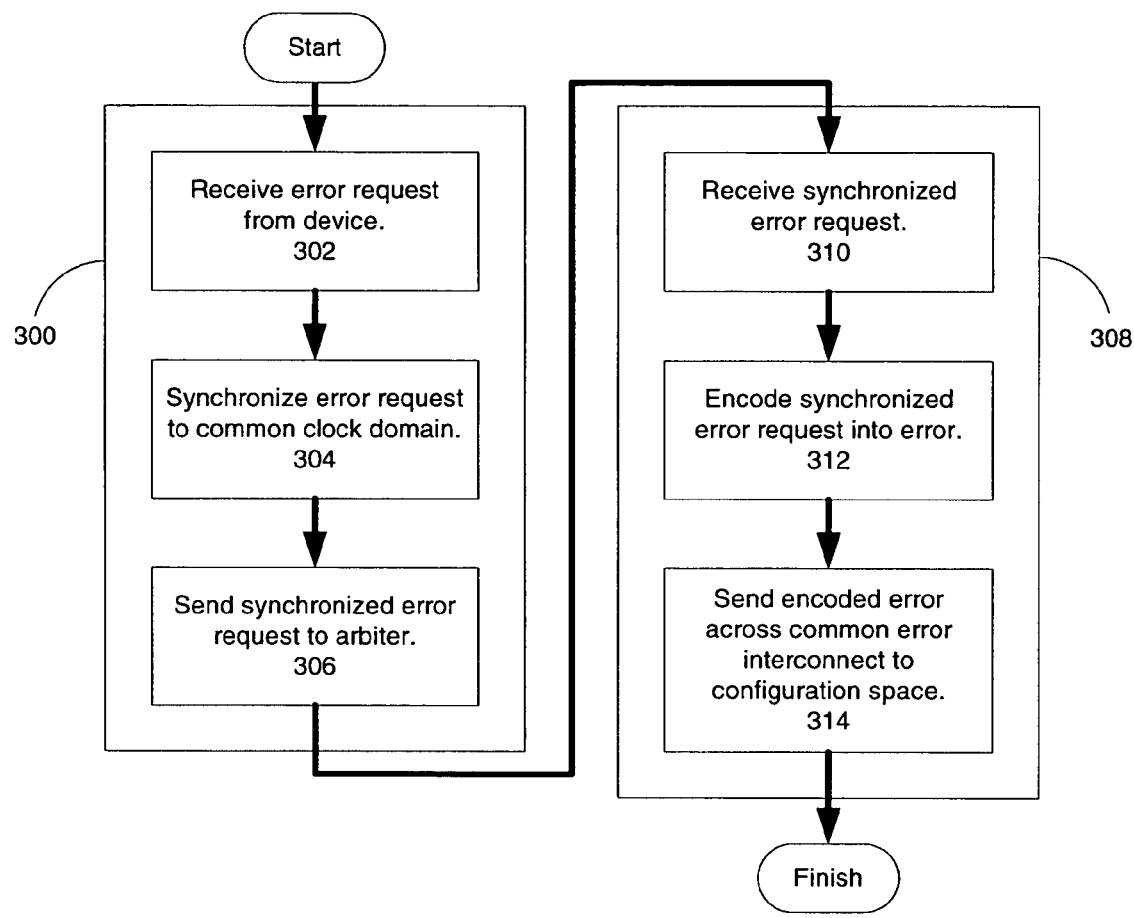
FIG. 3 is a flow diagram of one embodiment of a method for centralized error signaling and logging.

FIG. 3 is a flow diagram of one embodiment of a method for centralized error signaling and logging. The method is performed by processing logic that may comprise hardware (circuitry, dedicated logic, etc.), software (such as is run on a general purpose computer system or a dedicated machine), or a combination of both. Referring to FIG. 3, the method is divided into two parts, in one embodiment the first part is be completed by error receiving processing logic (dotted box 300) and the second part is be completed by arbiter processing logic (dotted box 308). The method begins by error receiving processing logic receiving an error request from a device (processing block 302). Next, error receiving processing logic synchronizes the error request to the common clock domain (processing block 304). Then error receiving processing logic sends the synchronized error request to arbiter processing logic (processing block 306). Arbiter processing logic then receives the synchronized error request (processing block 310). Next, arbiter processing logic encodes the synchronized error request into an error (processing block 312). Finally, arbiter processing logic sends the encoded error across the common error interconnect to configuration space for logging (processing block 314) and the process is finished.

Figure 4:
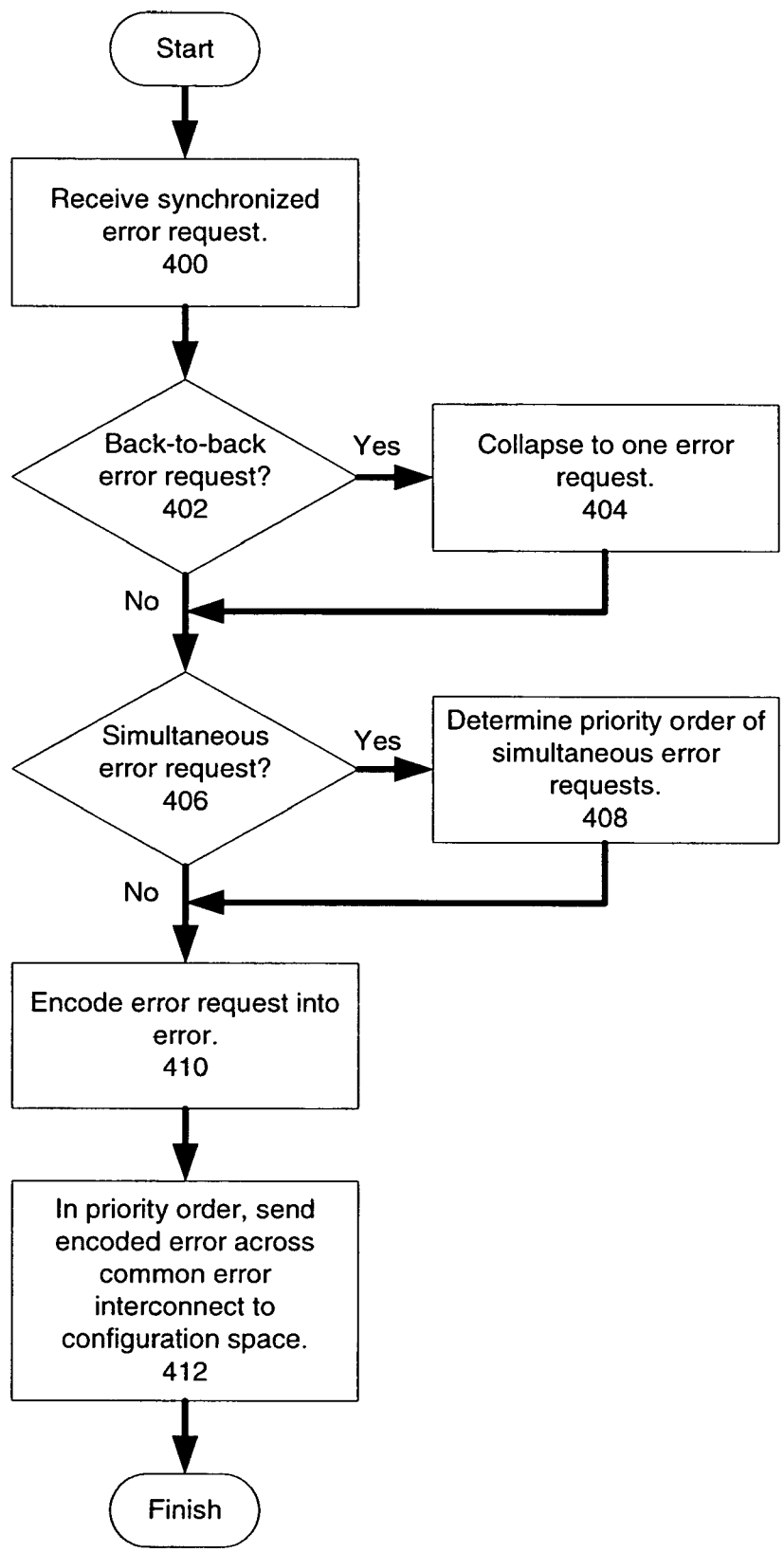
FIG. 4 is a flow diagram of one embodiment of a method for arbitration of errors.

FIG. 4 is a flow diagram of one embodiment of a method for arbitration of errors. The method is performed by processing logic that may comprise hardware (circuitry, dedicated logic, etc.), software (such as is run on a general purpose computer system or a dedicated machine), or a combination of both. Referring to FIG. 4, the method begins by processing logic receiving a synchronized error request (processing block 400). Next, processing logic determines if the received error request is a back-to-back request of the same type (processing block 402). If it is, processing logic next collapses the multiple requests to a single error request (processing block 404). Next, processing logic determines whether substantially simultaneous error requests have been received (processing block 406). If there are simultaneous requests, then processing logic determines the priority order of the requests (processing block 408). Next, processing logic encodes the error request into an error on the common error interconnect (processing block 410). Finally, in priority order, processing logic sends the encoded error across the common error interconnect to configuration space for logging (processing block 412) and the process is finished.

Figure 5:
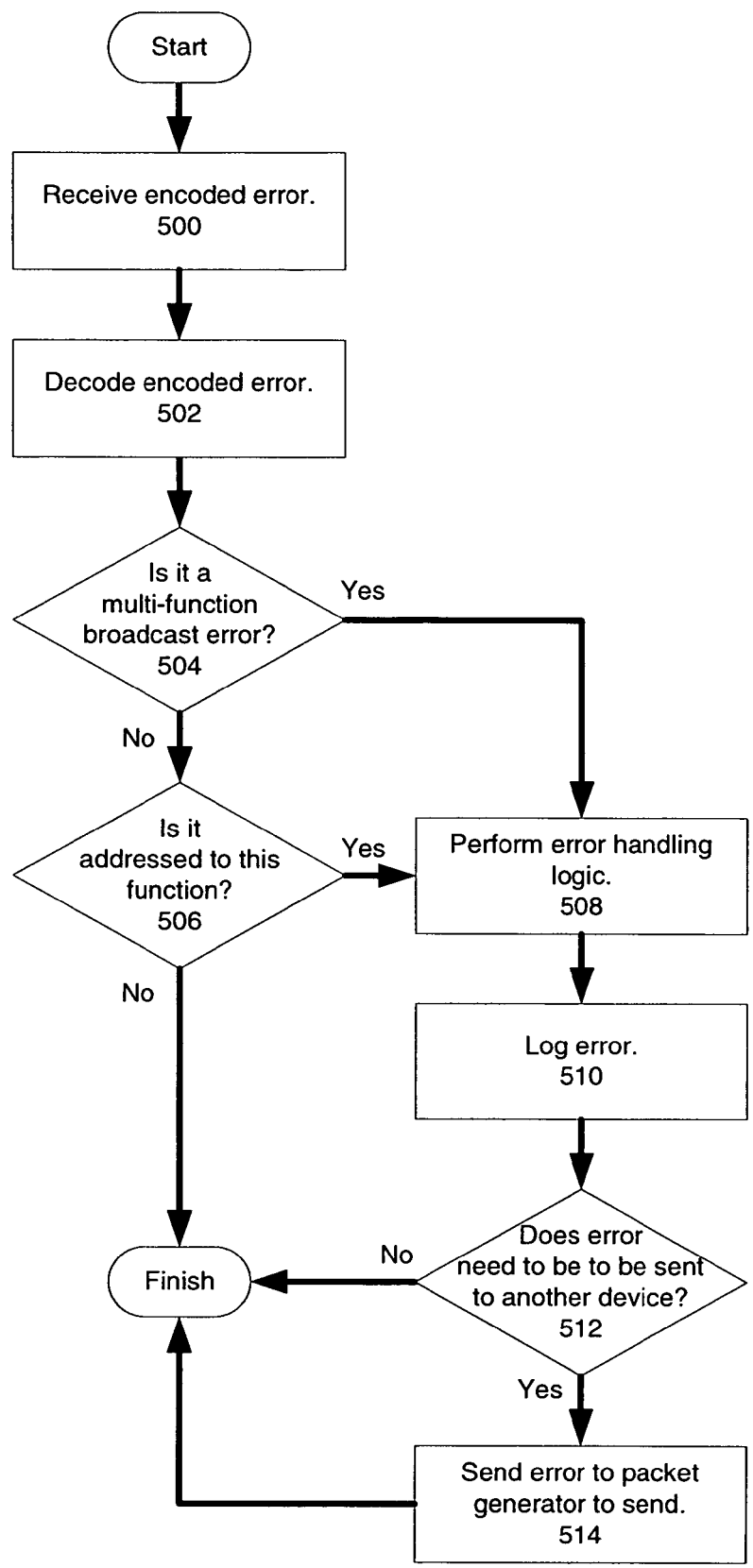
FIG. 5 is a flow diagram of one embodiment of a method for handling errors received from a common error interconnect.

FIG. 5 is a flow diagram of one embodiment of a method for handling errors received from a common error interconnect. The method is performed by processing logic within a given function in a device that may comprise hardware (circuitry, dedicated logic, etc.), software (such as is run on a general purpose computer system or a dedicated machine), or a combination of both. Referring to FIG. 4, the method begins by processing logic receiving an encoded error from the common error interconnect (processing block 500). Next, processing logic decodes the received encoded error (processing block 502). Then processing logic determines whether the error is a multi-function broadcasting error to all functions (processing block 504).

If the error is not a multi-function broadcasting error to all functions, then processing logic must determine if the error is addressed to the current function that processing logic is making the determination about (processing block 506). If the error is addressed to the current function that is being checked, then processing logic performs error handling logic for the function (processing block 508). In different embodiments, the error handling logic may include many different purposes including different ways to handle the severity of the error. Returning to processing block 504, if the error is a multi-function broadcasting error to all functions then processing logic immediately performs error handling logic (processing block 508) because there is no need to determine a specific address within the error.

If the error is not a multi-function broadcast error and the error is not addressed to the current function that processing logic is making the determination about, then the process is finished because the error was not intended to affect the current function. Otherwise, if processing logic has finished performing the error handling logic (processing block 508) then processing logic independently logs the error (processing block 510). Next, processing logic determines whether the error can be completely handled and taken care of in the current device and function, or whether the error needs to be sent to another device (processing logic 512). If the error information does not need to be reported to another device, then the process is finished. Otherwise, if the error must be reported upstream in a PCI Express™ architecture to a PCI Express™ Root Complex, then processing logic sends the error to a packet generator to send upstream (processing logic 514) and the process is finished. In one embodiment, the packet generator generates PCI Express™ transaction layer packets that can encapsulate the error information and send it across a PCI Express™ interconnect to PCI Express™ Root Complex devices. In one embodiment, the packet generator incorporates an arbiter to prioritize the packets being sent.

Thus, embodiments of a device, method, and system for centralized error signaling and logging are disclosed. These embodiments have been described with reference to specific exemplary embodiments thereof. In particular, to aid in general understanding, these embodiments have been made with a specific reference to a PCI Express™ implementation. Though, the device, method, and system may be implemented with any given protocol with any number of layers. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

What is claimed is:

1. An error handling device, comprising:
   a plurality of error receiving units, each operable to receive error requests directly from a given layer in a protocol and synchronize the received error requests to a common clock domain for all layers; and
   an arbiter unit operable to receive the synchronized error requests directly from each of the plurality of error receiving units, encode the error requests onto on a common error interconnect, and route the encoded error requests across the interconnect to configuration space.

2. The error handling device of claim 1, wherein the protocol comprises PCI Express.

3. The error handling device of claim 2, further comprising a transaction layer error receiving unit, a data link layer error receiving unit, and a physical layer error receiving unit.

4. The error handling device of claim 1, wherein the arbiter unit is further operable to collapse multiple back-to-back errors of the same type into a single error.

5. The error handling device of claim 1, wherein the arbiter unit is further operable to execute an arbitration policy to prioritize substantially simultaneous error requests.

6. The error handling device of claim 1, wherein the configuration space further comprises one or more PCI Express device and function configuration spaces.

7. The error handling device of claim 6, further comprising a packet generator unit to:
   receive a request to transmit an encoded error from function configuration space;
   generate an error message in one or more PCI Express transaction layer packets based on the encoded error received; and
   send one or more generated transaction layer packets to a PCI Express Root Complex.

8. The error handling device of claim 1, wherein the arbiter is further operable to encode and send multi-function errors to a plurality of functions' configuration spaces.

9. A method, comprising:
   receiving error requests directly from each of a plurality of layers in a protocols;
   synchronizing the received error requests to a common clock domain for all of the plurality of layers in the protocol; and
   encoding the error requests onto on a common error interconnect; and
   routing the encoded error requests across the interconnect to configuration space.

10. The method of claim 9, further comprising collapsing multiple back-to-back errors of the same type into a single error.

11. The method of claim 9, further comprising executing an arbitration policy to prioritize substantially simultaneous error requests.

12. The method claim 9, wherein the configuration space further comprises one or more PCI Express device and function configuration spaces.

13. A system, comprising:
   an error request interconnect;
   a common error interconnect;
   a plurality of error receiving units coupled to the error request interconnect, each operable to:
      receive all error requests from a given layer in a PCI Express protocol;
      synchronize the received error requests to a common clock domain for all layers; and
      send the synchronized requests across the error request interconnect; and
   an arbiter unit, coupled to the error request interconnect and the common error interconnect, operable to:
      receive the synchronized error requests on the error request interconnect from all of the plurality of error receiving units;
      encode the error requests onto the common error interconnect; and
      route the encoded error requests across the common error interconnect to appropriate configuration space.

14. The system of claim 13, further comprising a transaction layer error receiving unit, a data link layer error receiving unit, and a physical layer error receiving unit.

15. The system of claim 13, wherein the arbiter unit is further operable to collapse multiple back-to-back errors of the same type into a single error.

16. The system of claim 13, wherein the arbiter unit is further operable to execute an arbitration policy to prioritize substantially simultaneous error requests.

17. The system of claim 13, wherein the configuration space further comprises one or more PCI Express device and function configuration spaces.

18. The system of claim 17, further comprising a packet generator unit operable to:
   receive a request to transmit an encoded error from function configuration space;
   generate an error message in one or more PCI Express transaction layer packets based on the encoded error received; and
   send one or more generated transaction layer packets to a PCI Express Root Complex.

19. The system of claim 13, wherein the arbiter unit is further operable to encode and send multi-function errors to a plurality of functions' configuration spaces.

* * * * *